United States Patent
Kim et al.

(10) Patent No.: US 7,417,936 B2
(45) Date of Patent: Aug. 26, 2008

(54) OPTICAL PICKUP REDUCING NOISE AND POLARIZATION CHANGER

(75) Inventors: Ki-bok Kim, Suwon-si (KR); No-jun Kwak, Suwon-si (KR); Jong-ryull Kim, Siheung-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 541 days.

(21) Appl. No.: 10/704,558

(22) Filed: Nov. 12, 2003

(65) Prior Publication Data

US 2004/0218504 A1    Nov. 4, 2004

(30) Foreign Application Priority Data

Nov. 13, 2002   (KR) .................... 10-2002-0070456

(51) Int. Cl.
*G11B 7/135* (2006.01)
(52) U.S. Cl. .................... 369/112.17; 369/110.04; 369/110.01; 369/112.16; 369/112.19
(58) Field of Classification Search ............ 369/112.16, 369/110.04, 110.01, 112.01, 112.17, 112.19
See application file for complete search history.

(56) References Cited

U.S. PATENT DOCUMENTS

| | | | | |
|---|---|---|---|---|
| 4,532,619 A | * | 7/1985 | Sugiyama et al. | 369/106 |
| 4,870,632 A | * | 9/1989 | Shiono et al. | 369/44.23 |
| 5,007,021 A | * | 4/1991 | Hattori | 365/122 |
| 5,016,234 A | * | 5/1991 | Nakamura et al. | 369/44.14 |
| 5,365,535 A | * | 11/1994 | Yamaguchi et al. | 369/121 |
| 5,379,286 A | * | 1/1995 | Miyamoto | 369/112.21 |
| 5,418,769 A | * | 5/1995 | Inoue | 369/112.28 |
| 5,508,992 A | * | 4/1996 | Hirose et al. | 369/112.08 |
| 5,677,902 A | * | 10/1997 | Brazas, Jr. | 369/112.03 |
| 6,034,939 A | * | 3/2000 | Takasawa et al. | 369/112.17 |
| 7,072,254 B2 | * | 7/2006 | Kim et al. | 369/47.1 |

FOREIGN PATENT DOCUMENTS

| | | |
|---|---|---|
| JP | 8-7322 | 1/1996 |
| JP | 10-340471 | 12/1998 |

OTHER PUBLICATIONS

Office Action issued for related Korean Application No. 2002-70456 dated Aug. 27, 2004.

* cited by examiner

*Primary Examiner*—Wayne Young
*Assistant Examiner*—Thomas D Alunkal
(74) *Attorney, Agent, or Firm*—Staas & Halsey LLP

(57) ABSTRACT

An optical pickup includes a laser light source, an objective lens which focuses light emitted from the laser light source on an optical information storing medium, an optical path changer which changes a proceeding path of the light emitted from the laser light source, a polarization changer which changes the polarization of an incident light to make the polarization of light reflected by the optical information storing medium and reentering the laser light source different from that of the light emitted from the laser light source, so that noise generated due to interference by the light reflected by the optical information storing medium and reentering the laser light source is reduced, and a photodetector which receives incident light reflected by the optical information storing medium and sequentially passing through the objective lens and the optical path changer and detects an information signal and/or an error signal.

17 Claims, 3 Drawing Sheets

OPTICAL PICKUP REDUCING NOISE AND POLARIZATION CHANGER

CROSS-REFERENCE TO RELATED APPLICATIONS

This application claims the benefit of Korean Patent Application No. 2002-70456 filed on Nov. 13, 2002 in the Korean Intellectual Property Office, the disclosure of which is incorporated herein by reference.

BACKGROUND OF THE INVENTION

1. Field of the Invention

The present invention relates to an optical pickup, and more particularly, to an optical pickup which can reduce the generation of noise due to interference of light reflected by a recording medium and reentering a laser light source, and a polarization changer suitable for the optical pickup.

2. Description of the Related Art

In general, an optical recording and/or reproducing apparatus using an optical pickup records by focusing a laser light used as a light source emitted from a laser diode that is used as a light source on a recording medium (i.e., an optical disc) by using an objective lens. During reproduction, the optical recording and/or reproducing apparatus detects information signals recorded on the optical disc by receiving light reflected by the optical disc and converting the light to electric signals.

The light reflected by the optical disc during recording or reproduction generates noise due to the interference of the light emitted from the laser diode at a light emitting point as the reflected light reenters the laser diode. Since a high optical power is needed for a high multiple speed, the noise increases. Thus, for high multiple speed, the light reflected by the optical disc which generates noise must be reduced.

SUMMARY OF THE INVENTION

Accordingly, it is an aspect of the present invention to provide an optical pickup which can reduce the generation of noise due to interference of light reflected by an optical information storing medium and reentering a laser light source, and a polarization changer suitable for the optical pickup.

Additional aspects and/or advantages of the invention will be set forth in part in the description which follows and, in part, will be obvious from the description, or may be learned by practice of the invention.

The foregoing and/or other aspects of the present invention are achieved by providing an optical pickup comprising a laser light source, an objective lens which focuses a light emitted from the laser light source on an optical information storing medium an optical path changer which changes a proceeding path of the light emitted from the laser light source a polarization changer which changes a polarization of an incident light to make the polarization of the light reflected by the optical information storing medium and reentering the laser light source different from that of the light emitted from the laser light source, so that a noise generated due to an interference by the light reflected by the optical information storing medium and reentering the laser light source is reduced; and a photodetector which receives incident light reflected by the optical information storing medium and sequentially passing through the objective lens and the optical path changer and detects an information signal and/or an error signal. The polarization changer may be a quarter wave plate. The polarization changer is made of a plurality of wave plates in which optic axes are arranged offset from a line perpendicular to a plane of the wave plates, in opposite directions so that phase difference according to an incident angle of light is offset and corrected.

The optical path changer is a cubic beam splitter which transmits and reflects the incident light in a predetermined ratio, or transmits and reflects the incident light according to polarization of the incident light.

The polarization changer is arranged between the optical path changer and the optical information storing medium.

According to another aspect of the present invention, a polarization changer made of a plurality of wave plates in which optic axes are arranged offset from a line perpendicular to a plane of the wave plates, in opposite directions so that phase difference according to an incident angle of light is offset and corrected.

The polarization changer functions as a quarter wave plate.

The polarization changer is made by attaching a plurality of wave plates wherein a plurality of optic axes are alternately arranged so that a phase difference according to an incident angle of light is offset and corrected.

BRIEF DESCRIPTION OF THE DRAWINGS

These and/or other aspects and advantages of the present will become apparent and more readily appreciated from the following description of the embodiments taken in conjunction with the accompanying drawings in which.

DETAILED DESCRIPTION OF THE PREFERRED EMBODIMENTS

Figure 1:
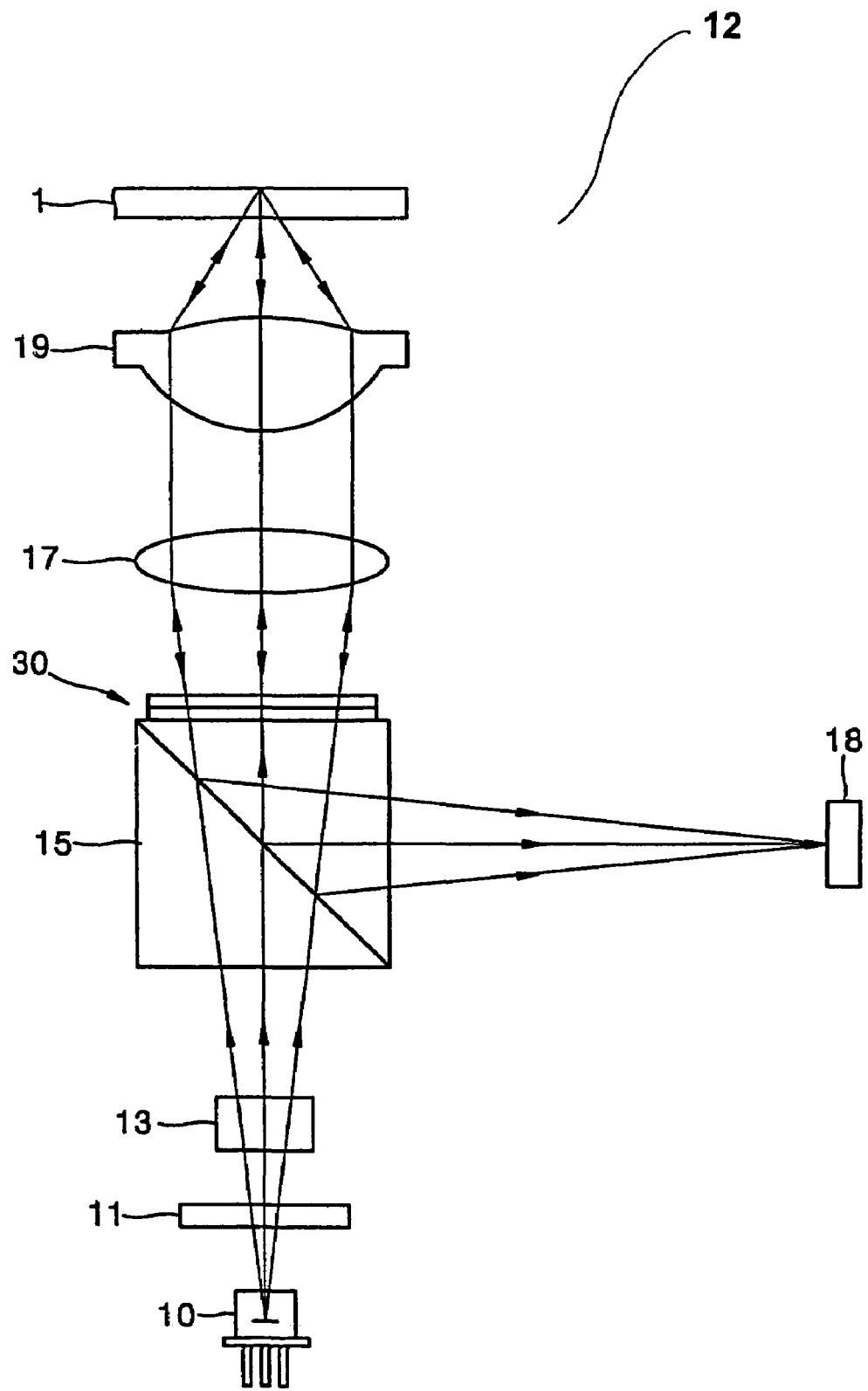
FIG. 1 is a view illustrating the optical configuration of an optical pickup according to a aspect of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Referring to FIG. 1, an optical pickup 12 according to an embodiment of the present invention comprises a laser light source 10, an objective lens 19 which focuses a light emitted from the laser light source 10 on an optical disc 1, an optical path changer 15 which changes a proceeding path of the light emitted from the laser light source 10, a polarization changer 30 which reduces noise, and a photodetector 18 which receives light reflected by the optical disc 1 and detects an information signal and/or an error signal. The optical pickup further comprises a grating 11 which branches the light emitted from the laser light source 10 into at least three light rays to enable detection of a tracking error signal by a three beam method and a collimating lens 13 which reduces a focal length of an optical system for the optical disc 1.

The laser light source 10 may be a semiconductor laser. The laser light source 10 emits a laser light which is linearly polarized mainly in one direction. The laser light source 10 may be a single light source which emits light having a single wavelength or a light source module (for example, a Twin-LD) which emits two light beams having different wavelengths such as a light ray in a red wavelength area suitable for a DVD and a light ray in an infrared wavelength area suitable for a CD.

The optical path changer 15 may be a cubic beam splitter which transmits and reflects incident light in a predetermined ratio, or transmits or reflects the incident light according to the polarization, as shown in FIG. 1. Also, the optical path changer 15 may be a plate beam splitter.

The polarization changer 30 minimizes noise due to interference of a light reflected by the optical disc 1 and reentered toward the laser light source 10, by changing the polarization of the light.

The light is emitted from the laser light source 10 toward the optical disc 1. Some of the light reflected by the optical disc 1 reenters the laser light source 10. When the polarization changer does not exist, since the reentering light and the light emitted from a light emitting point of the laser light source 10 have almost the same polarization, interference is generated. Thus, resulting in the generation of noise.

However, when the polarization changer 30 as in the optical pickup 12 according to the present invention is provided, the polarization of light emitted from the light emitting point of the laser light source 10 and the polarization of the light reflected by the optical disc 1 and reentering the laser light source 10 differ from each other. Thus, interference may be removed or reduced thereby reducing noise generation. Therefore, by providing an optical pickup 12 having a polarization changer 30, noise does not increase when the optical pickup 12 is used at a high multiple speed thereby requiring additional power.

The polarization changer 30 may be a quarter wave plate with respect to the wavelength of the light emitted from the laser light source 10.

When S polarized light is emitted from the laser light source 10, the light is changed to a first circularly polarized light as it passes through the polarization changer 30. Then, the first circularly polarized light is changed to a second circularly polarized light orthogonal to the first circularly polarized light as it is reflected by the optical disc 1. The second circularly polarized light is changed to p polarized light as it passes through the polarization changer 30. Since the light generated from the light emitting point of the laser light source 10 is S polarized light, and the light reflected by the optical disc 1 and reentering the laser light source 10 is P polarized light, the polarizations of the two lights are orthogonal to each other so that interference does not occur. Therefore, by providing the polarization changer 30, noise can be greatly reduced.

As in the optical pickup 12 according to an aspect of the present invention, when the optical path changer is a cubic beam splitter, the polarization changer 30 may be arranged between the optical path changer 15 and the optical disc 1 to reduce an error due to a phase delay by the optical path changer 15. The polarization changer 30 may be attached to a surface of the optical path changer 15 toward the optical disc 1 as shown in FIG. 1.

When the polarization changer 30 is provided between the optical path changer 15 and the optical disc 1, if the optical pickup 12 according to the present invention comprises a light source using two light rays having different wavelengths, the change in phase with respect to the two wavelengths can be adjusted together.

The reasons for arranging the polarization changer 30 between the optical path changer 15 and the optical disc 1 when the optical path changer 15 is a cubic beam splitter is as follows.

The polarization changer 30 changes linearly polarized light emitted from the laser light source 10 to a circularly polarized light. However, when phase delay due to the optical path changer 15 is generated, the light proceeding toward the optical disc 1 comprises both a circularly polarized component and a considerable amount of an elliptically polarized component. When the light irradiated on the optical disc 1 is elliptically polarized light, an effect of reducing noise due to interference of light reentering the laser light source 10 by changing the polarization of the light using the polarization changer 30, may be lowered and it is difficult to appropriately correspond to a birefringent optical disc 1. As a result, an amount of the light reflected by the optical disc 1 and traveling back to the laser light source 10 becoming an orthogonal polarization to the light emitted from the laser light source 10 is reduced so that the amount of interference increases.

When the light passing through the polarization changer 30 becomes an elliptically polarized light, the elliptically polarized light does not correspond to the optical disc 1 for the following reasons.

The birefringence of the optical disc 1 is provided since the density of a medium of the optical disc 1 is irregularly formed when the optical disc 1 is reproduced. Thus, when light passes through portions of the optical disc 1 where the density of the medium thereof is different, the light is effected as if it passes through medium having different refractive indexes. Therefore, the irregularity of the density makes the optical disc 1 having irregular density birefringent.

Since in the circular polarization the amounts of the two linear polarization components are the same, when circularly polarized light is irradiated on the optical disc 1, a degree that the circularly polarized light is changed to elliptically polarized light as it is reflected by the optical disc 1 due to the birefringence of the optical disc 1 is relatively weak. However, when the elliptically polarized light is incident on the birefringent optical disc 1, the ellipticity of the elliptically polarized light is reflected by the optical disc 1 and a degree of being elliptical is serious. Thus, when the elliptically polarized light is incident on the birefringent optical disc 1, the amount of generation of noise may increase since a possibility that the light reflected by the birefringent optical disc 1 and reentering the laser light source 10 has the same polarization as the light emitted from the laser light source 10 is higher than a case in which circularly polarized light is incident on the birefringent optical disc 1.

Thus, when the optical path changer 15 is a cubic beam splitter, the polarization changer 30 may be arranged between the optical path changer 15 and the optical disc 1 to reduce an error due to phase delay in the optical path changer 15.

Figure 3:
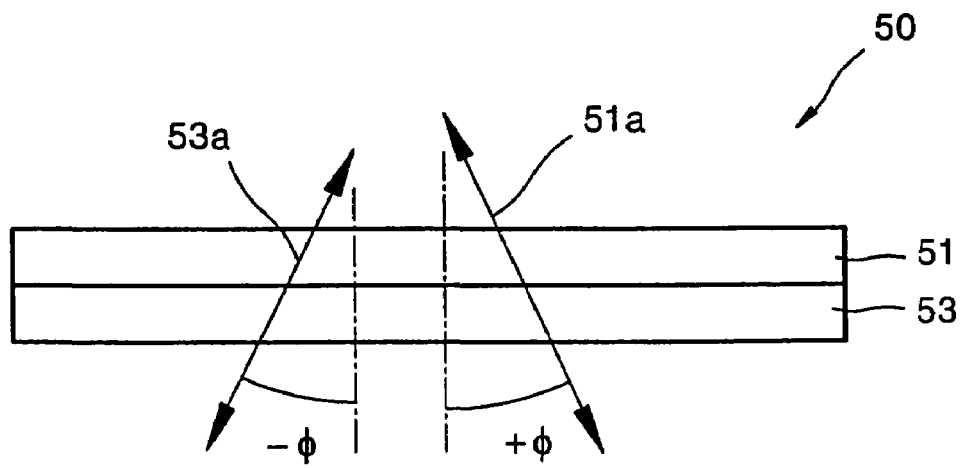
FIG. 3 is a sectional view illustrating the arrangement of optic axes of first and second wave plates constituting a polarization changer according to an aspect of the present invention.

The polarization changer 50 of FIG. 3 according to the present invention can change the incident linearly polarized light to a circularly polarized light without being affected by a degree of divergence and convergence of the light.

Figure 2:
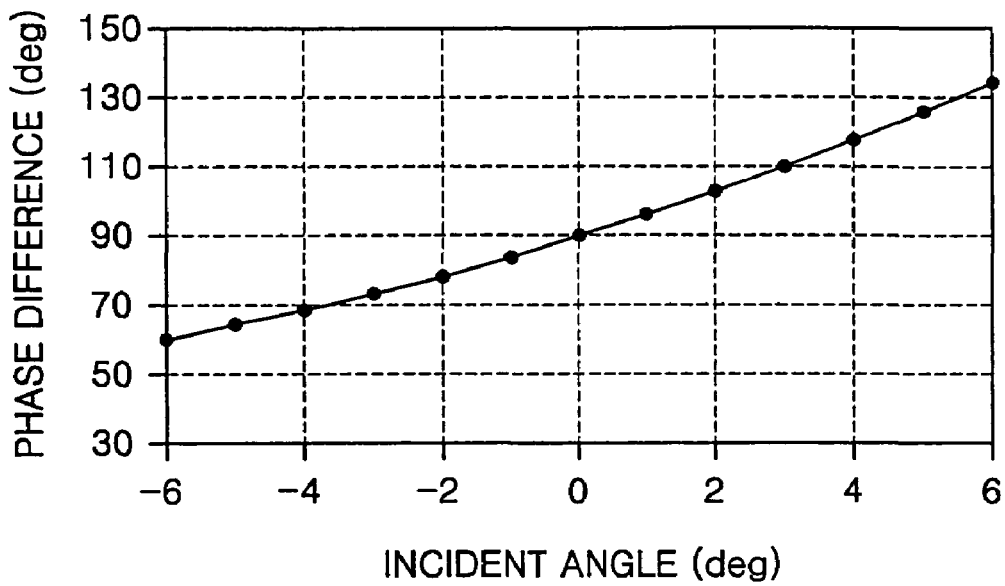
FIG. 2 is a graph showing a phase difference between light rays linearly polarized in two optic axes (a fast axis and a slow axis) directions according to an incident angle of light on a conventional quarter wave plate.

FIG. 2 is a graph showing a phase difference between light rays linearly polarized in two optic axes (a fast axis and a slow axis) directions according to an incident angle of light on a conventional quarter wave plate. As shown in FIG. 2 the phase difference occurring when light having an incident angle of 0° (i.e., light perpendicularly incident) passes through a quarter wave plate is 90° corresponding to a ¼ wavelength. When light having an incident angle of +3° passes through the quarter wave plate, a phase difference of approximately 110° is generated.

Since the polarization of the light is a vector, in any polarization state the light can be decomposed into two linear polarization components which are orthogonal to each other. For example, when linearly polarized light making an angle of 45° with respect to one optic axis of the quarter wave plate is perpendicularly incident on the quarter wave plate, the incident linearly polarized light is changed to circularly polarized light after passing through the quarter wave plate. However, linearly polarized light incident on the quarter wave plate at a predetermined incident angle can be changed to elliptically polarized light after passing through the quarter wave plate. Since the phase difference varies according to the incident angle of light on the quarter wave plate, in order to change linearly polarized light to circularly polarized light, the light needs to be perpendicularly incident on the quarter wave plate.

However, in an optical pickup 12, as shown in FIG. 1, a divergent light can be incident on the polarization changer 30 according to the position of the collimating lens 17. When a divergent light is input, the range of an incident angle of the light on the polarization changer 30 is from −θ to +θ.

When a divergent light is incident on the polarization changer 30 as shown in FIG. 1, even if the polarization changer 30 is a quarter wave plate, all the incident linearly polarized light cannot be changed to circularly polarized light, that is, a portion of the light is changed to circularly polarized light and a portion of the light is changed to elliptically polarized light.

FIG. 3 is a sectional view illustrating the structure of the polarization changer 50 according to the present invention. In FIG. 3, the arrangement of optic axes of the first and second wave plates 51 and 53 constituting the polarization changer 50 according to the present invention is shown. The polarization changer 50 according to the present invention made of first and second wave plates 51 and 53 in which optic axes 51a and 53a are arranged offset from a line perpendicular to a plane of wave plates 51 and 53, in opposite directions with respect to a direction in which light is input so that incident linearly polarized light is almost changed to circularly polarized light, by correcting the phase difference (i.e., offsetting the phase difference according to an incident angle of light, even when linearly polarized light in the form of a divergent light or a convergent light is input.)

The optic axes 51a and 53a of the first and second wave plates 51 and 53 are symmetrical to the light incident direction. Thus, the optic axis 51a of the first wave plate 51 makes an angle of +φ with respect to the light incident direction while the optic axis 53a of the second wave plate 53 makes an angle of −φ with respect to the light incident direction. The fast axis and slow axis directions of the first and second wave plates 51 and 53 are the same.

When the polarization changer 50 is a quarter wave plate, the first and second wave plates 51 and 53 are provided to function as ⅛ wave plates by having the same optical thickness. The polarization changer 50 having the above structure may be formed by cutting a quarter wave plate into two pieces and attaching the two pieces to each other such that the optic axes 51a and 53a thereof are arranged offset from a line perpendicular to a plane of wave plates 51 and 53, in opposite directions.

Figure 4:
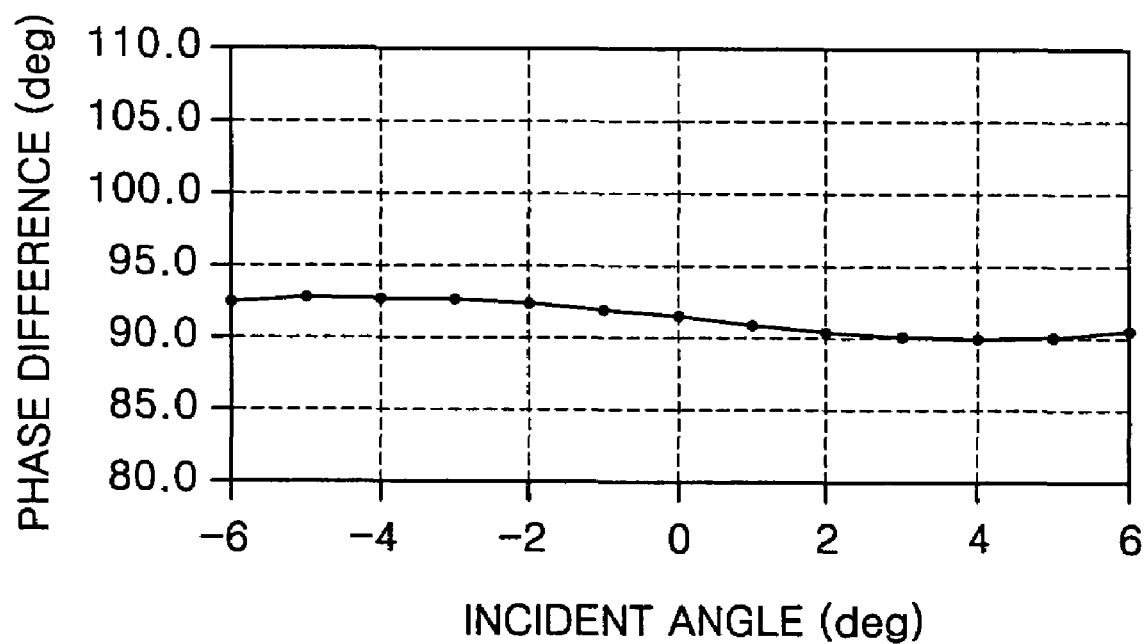
FIG. 4 is a graph showing a phase difference between light rays linearly polarized in two optic axes directions according to an incident angle of light on the polarization changer according to the present invention as shown in FIG. 3.

As shown in FIG. 3, when the polarization changer 50 is made by two wave plates 51 and 53 such that the optic axes 51a and 53a are arranged offset from a line perpendicular to a plane of wave plates 51 and 53, in opposite directions, since the phase difference due to an incident angle can be corrected by offsetting phase differences according to the incident angle, as shown in FIG. 4, a change in the phase difference according to an incident angle can be reduced compared to the phase difference of a ¼ wavelength as shown in FIG. 2.

Since the phase difference is changed minimally according to an incident angle, a divergent linearly polarized light may be changed to circularly polarized light. By using the polarization changer 50 according to an aspect of the present invention, parallel or convergent linearly polarized light may be changed to circularly polarized light.

In the above description, the polarization changer 50 according to an aspect of the present invention is made of two wave plates 51 and 53 having optic axes 51a and 53a arranged offset from a line perpendicular to a plane of wave plates 51 and 53, in opposite directions. However, the present invention is not limited to the above description and a variety of modifications and equivalent preferred embodiments are available. The polarization changer 50 may be made of two or more wave plates in which optic axes are arranged offset from a line perpendicular to a plane of the wave plates, in opposite directions.

Also, instead of making the polarization changer 50 according to an aspect of the present invention as described above by cutting a quarter wave plate into two or more pieces and attaching the cut wave plates such that the optic axes of the cut wave plates can be alternately arranged, the polarization changer 50 may be made by fixing or attaching a plurality of wave plates such that optic axes thereof can be arranged offset from a line perpendicular to a plane of the wave plates, in opposite directions to correct phase difference due to an incident angle.

When the polarization changer 50 made by two or more wave plates having alternately arranged optic axes is used, incident linearly polarized light may be changed to circularly polarized light regardless of whether the incident light is a convergent, divergent, or parallel light beam.

Thus, by using the polarization changer 50 according to an aspect of the present invention, noise generated due to interference of light reentering the laser light source 10 may be reduced and the birefringent optical disc 1 may be appropriately corresponded.

In addition to the optical pickup 12 having the polarization changer 30,50 according to the present invention shown in FIG. 1 and FIG. 3, the polarization changer 30,50 may be applied to optical pickups having a variety of optical structures. Also, the polarization changer 30 according to the present invention may be applied to different types of optical systems.

As described above, the optical pickup according to an aspect of the present invention, since the polarization changer is provided such that the polarization of the light reflected by the optical disc (i.e., an optical information storing medium) and reentering the laser light source is different from that of the light generated from a light emitting point of the laser light source, interference may be reduced and the generation of noise due to interference may also be reduced.

Thus, the optical pickup according to an aspect of the present invention may be used for a high multiple speed which requires additional optical power. Furthermore, since the polarization changer according to an aspect of the present invention is made of a plurality of wave plates having optic axes arranged offset a line perpendicular to a plane of the wave plates, in opposite directions, the phase difference due to an incident angle may be corrected. Accordingly, when the polarization changer is applied to the optical pickup, even when the incident light is a divergent light or a convergent light, the generation of noise due to interference may be reduced.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup compatible with an optical information storing medium, comprising:
   a laser light source;
   an objective lens which focuses a light emitted from the laser light source on the optical information storing medium;
   an optical path changer which changes a proceeding path of the light emitted from the laser light source;
   a quarter wave plate made of a plurality of wave plates having a plurality of optic axes arranged offset from a line perpendicular to a plane of the wave plates in opposite directions so that a phase difference according to an incident angle of light is offset and corrected, the quarter wave plate changing a polarization of an incident light to make the polarization of a light reflected by the optical information storing medium and reentering the laser light source different from the light emitted from the laser light source, such that the light emitted from the laser light source is changed to circularly polarized light as it passes through the quarter wave plate, then the light reflected by the optical information storing medium is changed to a circularly polarized light orthogonal to that of the light emitted from the laser light source and passing through the quarter wave plate, such that the polarizations of the light generated from a light emitting point of the laser light source and the light reflected by the optical information storing medium and reentering the laser light source are orthogonal to each other so that a noise generated due to an interference by the light reflected by the optical information storing medium and reentering the laser light source is reduced; and
   a photodetector spaced apart from the optical path changer and the quarter wave plate, which receives the incident light reflected by the optical information storing medium and sequentially passing through the objective lens and the optical path changer and detects an information signal or an error signal.

2. The optical pickup of claim 1, wherein the optical path changer is a cubic beam splitter which transmits and reflects the incident light in a predetermined ratio.

3. The optical pickup of claim 2, wherein the quarter wave plate is arranged between the optical path changer and the optical information storing medium to reduce an error due to a phase delay in the optical path changer.

4. The optical pickup of claim 1, wherein the optical path changer transmits and reflects the incident light according to the polarization of the incident light.

5. The optical pickup of claim 1, wherein the quarter wave plate is arranged between the optical path changer and the optical information storing medium.

6. The optical pickup of claim 1, further comprising a grating which branches the light emitted from the laser light source into a plurality of light rays to enable detection of a tracking error signal.

7. The optical pickup of claim 1, further comprising a collimating lens which reduces a focal length of an optical system.

8. The optical pickup of claim 1, wherein the laser light source is a semiconductor laser.

9. The optical pickup of claim 1, wherein the laser light source is a light source which emits light having a single wavelength.

10. The optical pickup of claim 1, wherein the laser light source is a light source module which emits a first light beam and a second light beam having different wavelengths.

11. The optical pickup of claim 1, wherein the optical path changer is a plate beam splitter.

12. The optical pickup of claim 1, wherein the quarter wave plate minimizes a noise due to an interference of a light which is reflected by the optical information storing medium and which reenters toward the laser light source.

13. The optical pickup of claim 1, wherein when a light is emitted from the laser light source, the light is changed to a first circularly polarized light as the light passes through the quarter wave plate; and
   the light is changed to a second circularly polarized light orthogonal to the first circularly polarized light upon being reflected by the optical information storing medium so that an interference does not occur between the first circularly polarized light and the second circularly polarized light.

14. The optical pickup of claim 1, wherein the quarter wave plate is attached to a surface of the optical path changer toward the optical information storing medium.

15. The optical pickup of claim 1, wherein the quarter wave plate comprises a first wave plate and a second wave plate having a first optic axis and a second optic axis, respectively wherein the first optic axis and the second optic axis are arranged offset from a line perpendicular to a plane of the first and second wave plates, in opposite directions so that a phase difference according to an incident angle of light is offset and corrected.

16. A polarization changer functioning as a quarter wave plate, the polarization changer comprising a plurality of wave plates attached to each other and having a plurality of optic axes arranged offset from a line perpendicular to a plane of the wave plates in opposite directions so that a phase difference according to an incident angle of light is offset and corrected.

17. A polarization changer functioning as a quarter wave plate, the polarization changer comprising a first wave plate and a second wave plate attached to each other and having a first optic axis and a second optic axis, respectively, wherein the first optic axis and the second optic axis are arranged offset from a line perpendicular to a plane of the first and second wave plates, in opposite directions with respect to a direction in which a light is input so that an incident linearly polarized light is changed to a circularly polarized light by correcting and offsetting a phase difference according to an incident angle.

* * * * *